Feb. 26, 1929.
A. J. KLONECK
ELECTRICAL SIGNALING
Filed April 18, 1921
1,703,197
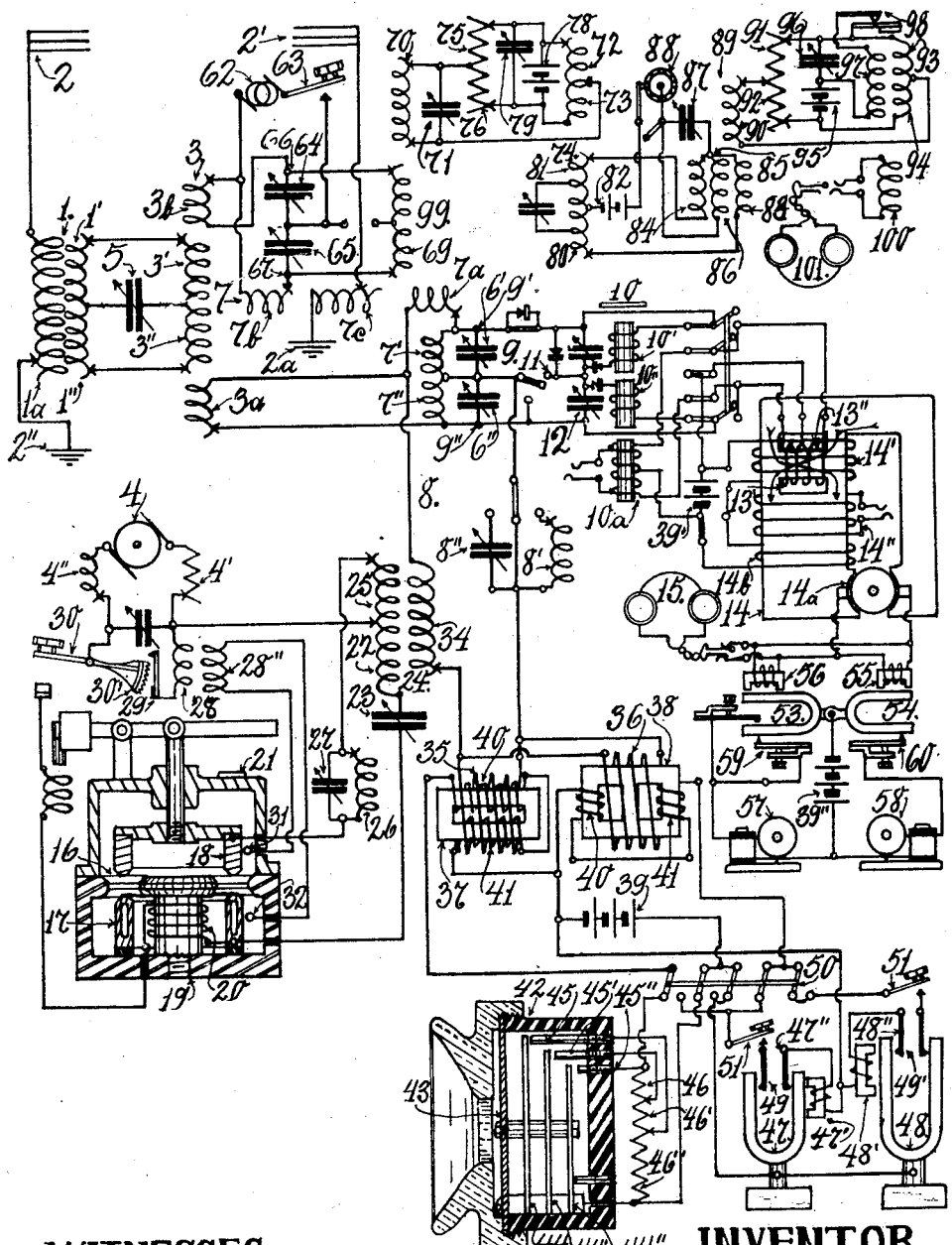
WITNESSES.
INVENTOR.
August J. Kloneck.

Patented Feb. 26, 1929.

1,703,197

UNITED STATES PATENT OFFICE.

AUGUST J. KLONECK, OF NEW YORK, N. Y.

ELECTRICAL SIGNALING.

Application filed April 18, 1921. Serial No. 462,321.

This invention relates to signaling systems and more particularly to that type wherein transmission and reception of signals are independent of one another.

One object of the invention is to provide suitable electrical circuits and elements which will permit transmission and reception of electrical signals simultaneously.

Another object of the invention is to provide suitable circuits and elements for amplifying transmitted and received signals through similar apparatus.

These and other allied objects are attained by a novel combination of electrical circuits and elements hereinafter more fully described and shown in the accompanying drawings wherein:—

The figure shows electrical circuits and apparatus for simultaneously transmitting and receiving electrical signals.

Referring more particularly to the drawings, the numeral 1 designates a transformer having one coil 1ª connected between an aerial 2 and a ground 2″ or to any other desired communicating conductors. Two other coils 1′ and 1″ of said transformer 1 are connected in series with two coils 3′ and 3″ of an intermediate transformer 3. Another coil 3ª of transformer 3 has one terminal connected to condensers 12 and 6″, the coil 7″ of an autotransformer which serves as an inductance and further to coils 10″ or 13″ of two receivers by means of a switch in the receiving circuit 9. The other terminal of coil 3ª is connected to one terminal of a transmitting circuit 8 and also through a coil 7ª of another aerial circuit to a terminal of said receiving circuit 9 including suitable elements for the latter. The other terminal of the transmitting circuit 8 is connected between the condensers 6′, 6″ and inductance coils 7′ and 7″ of equal values to the terminals of said receiving circuit 9 so that a current from said transmitting circuit 8 will produce no potential difference and no resultant affection of the receiving circuit.

The transmitting circuit 8 comprises the source of electrical current 4. The latter is connected through a current regulating resistance 4′ and inductance 4″ and suitable other elements to a spark gap 16. The latter consists of flat or circular electrodes 17 and 18 having edge shaped elements facing toward one another. A blow out magnet 19 is energized through a coil 20 serving for a magnetic blast through the gap between the electrodes 17 and 18. Said magnet 19 has circular pole pieces to conform to the shape of the electrodes. One of its poles is arranged within and the other pole around the outside of the circular electrodes 17 and 18. A casing 21 enclosing the electrodes permits the operation of the spark gap in a suitable gas. The circuit including the spark gap, the primary coil 25 and the tuning elements 26 and 27 if desirable is shunted by an oscillation circuit embracing the inductance 22 and a condenser 23. The inductance 22 simultaneously serves as another primary of a transformer 24. In this improved arrangement, said primary coil 25 operates in series with the spark gap 16 and the source of current 4 including other convenient elements; while another primary coil 22 and a condenser 23 are connected in multiple to the coil 25 and the other mentioned elements. In this case the current which surges through the oscillation circuit 22—23 and in shunt thereof through the spark gap 16 will thus alternately energize the primary coil 22 and the primary coil 25 of transformer 24 and thus increase the efficiency of the same. A tuning inductance 26 shunted by a condenser 27 may be inserted between coil 25 and the electrode 18 of the spark gap. The circuit from the source of current 4 comprises one terminal connected between the primary coils 22 and 25 and the other terminal connected through the magnetizing coil 20 to electrode 17 and the spark gap and in multiple thereof through condenser 23 and inductance 22 while coil 25 is connected to electrode 18. For the purpose of permitting an easy starting of spark gap 16 the same is provided with a separate high tension spark coil for discharging through the spark gap between the electrodes 17, 18.

The primary 28 of said spark coil is connected to resistance 4″ and to a tooth shaped spring 29, the latter connecting through a toothed segment 30′ of a key 30 to impedance 4″ and the dynamo adapted for interrupting the current of the starting spark coil by closing the key 30. The secondary 28″ of said spark coil 28 terminates in two electrodes 31 and 32. The latter form a spark gap in series with the electrodes 17 and 18 and gap 16 for starting the oscillation producing arc through the gap 16.

The secondary coil 34 of transformer 24 has one terminal connected through two coils 35 and 36 of two modulating transformers 37 and 38. The other terminal of coil 34 is connected through the coils 3$^a$ and 7$^a$ of separate aerial circuits to the terminals of the receiving circuit 9. The other ends from the coils 35 and 36 of said modulating transformers are connected together and to a junction between condensers 6′, 6″ or inductances 7′, 7″, or both so as to form two opposed circuits and a current of equal character or of a zero potential difference between the terminals 9′ and 9″ of the receiving circuit 9 for preventing an energization of the latter by transmitting current which effect will be later more fully described.

Said modulation transformers 37 and 38 consist of the energizing coils 40 and 41, and the high frequency coils 35 or 36 upon suitable iron cores which at a certain magnetic saturation of the core by another source of current 39 cease to act as choking coils and thus permit the flow of the high frequency current from transformer 34 to transformer 3 and to the aerial 2 by suitably tuning the primaries 3$^a$ and 7$^a$ and condensers 6′ and 6″ or by employing an additional inductance 8′ or a condenser 8″ for tuning. But when the iron cores of said transformers are not magnetically saturated then the same will form high impedance choke coil and prevent a flow of high frequency current through the coils 35 and 36 and an energization of the aerial or communicating circuits.

The modulation transformer 37 comprises two saturating coils 40 and 41 for energizing two legs of the closed core forming transformer 37 in two equal but opposed directions with respect to the high frequency coil 35. The modulation transformer 38 however comprises the coils 40, 41 arranged at right angles with respect to the high frequency current coil 36.

The iron cores of said modulation transformers including their saturating coils are arranged within the high frequency coils 35 and 36, for permitting a rapid change of magnetic energization and an easy control of the high frequency currents.

The energization of said modulation transformers for varying the transmitting current will be modified by a telephone transmitter or by telegraphic transmitter as desired. In the present arrangement both telephone and telegraphic transmission are simultaneously carried on at one current frequency. The reception of such double transmission is based upon the fact that speech and a high pitched note as employed for telegraph transmission will be easily distinguished. In the present system both telephone transmitters and tuning forks operate jointly or separately upon said modulation transformers.

A telephone transmitter which permits an operation by large currents can not be one of the carbon grain microphones as at present employed for small currents. A telephone transmitter employed for this purpose consists of a casing 42 having a diaphragm 43. Three contact forming springs 44, 44′ and 44″ are attached upon said diaphragm in a manner so as to connect successively with the contacts 45, 45′ and 45″. Inductive resistances 46 and 46′ arranged between said contacts and in the circuit of battery 39 and the saturation coils of modulation transformer 35, and also another resistance 46″ if desired is arranged in series with the battery adapted for reducing a sparking between the contacts. A modulation of the transmitting current thus will be proportional to the number of contacts closed. Since there is a certain time required for the saturation of the iron cores of said modulation transformers, it makes the use of such contact transmitter suitable for all modulations. The resistances 46, 46′ and 46″ will permit a closer adjustment to certain speech frequencies and obviate noise.

For transmission of code signals serve tuning forks 47 and 48 for producing a high pitched note of the transmitting current. The electromagnets 47′, 48′ of said tuning forks are connected in series with the interrupting contacts 47″ and 48″ and the battery 39, while two other contacts 49 and 49′ are connectable by switches 50 to one or both of said modulation transformers 37 and 38 and the transmitting signal instruments 51.

The reception of signals is simultaneously carried on during the transmission period by the arrangement of said transformer coils 3$^a$, 7$^a$ and the condensers 6′ and 6″ which as already described cause a transmitting current to produce zero potential between the terminals 9′ and 9″ of the receiving circuit 9. The latter is connected to the aerial 2 through the same coils and transformers 1 and 3 as the transmitting circuit. The coil 7$^a$ serves for balancing coil 3$^a$ for the receiving circuit 9 and is connected to a separate aerial 2′ if desired.

One of the receiving instruments consists of an iron core receiver 10 having two coils 10′ and 10″ connected to said terminals 9′ and 9″ and the aerial circuit as mentioned before. The intermediate terminals of the receiver coils 10′ and 10″ are connected together and by a switch 11 to the terminal of the transmitting circuit intermediate said two condensers 6′ and 6″, if desired. The last mentioned circuit connection forms a modification of that with switch 11 open. However the character of operation will remain the same. Said receiver coils 10′ and 10″ are shunted by suitable condensers 12. Suitable detectors will be employed in series with or between said coils or condensers or omitted as convenient or desired. For the apparatus now to be described however, a detector is not required for the following reason. By arranging suitable receiving coils 13', 13" which are energized by the received alternating currents at a right angle in a strong magnetic field such as produced by a coil 14' for instance, which latter is energized by current from battery 39', then the magnetic lines of force produced by received currents upon coils 13', 13" are deflected and caused to flow in the same directions with the lines of the magnetic field of coil 14' as indicated by the arrows upon the field of the dynamo 14 and thus energizing the field by such unidirected or rectified alternating currents for amplifying the signals by currents generated in the armature $14^a$ of the dynamo 14. However, such rectified or unidirected receiving currents may be obtained by a coil 14". Another coil $14^b$ is arranged upon the field of the dynamo 14 and connected to battery 39' adapted to reduce the superimposed magnetic field produced by coil 14' to a zero value if desired at a point distant from the coil 14' so as to produce a greater fluctuating current by said dynamo. Instead of connecting the receiving coils 13', 13" directly to the receiver 10 and the receiving circuit 9, I prefer to connect the same to a coil $10^a$ which is loosely coupled with the receiving coils 10', 10" to obtain a loose coupling effect for cutting out undesirable signals. In connection with these receiving apparatus there is also employed an amplifying means such as described in connection with the transformers 1 and 3. For this purpose, battery 39' is connected with one terminal intermediate the coils 13' and 13" and with the other terminal to an intermediate point of coil $10^a$ of receiver 10, the operation of which consists in superimposing the voltage of the signal current upon that of the battery current. A telephone receiver 15 may be plugged to coil $10^a$, to coil 14" or between the armature terminals of the dynamo for supervising the operations.

The dynamo current from its armature $14^a$ serves for operating two tuning forks 53 and 54 by means of the electromagnets 55 and 56. A local battery 39" is connected with one terminal to the contacts of said tuning forks 53, 54 and with the other terminal to two receiving instruments 57 and 58, which may be code printing apparatus. Each one of the latter is connected by an interrupter contact 59 or 60 to one of said tuning forks 53 and 54.

Another independent simultaneous transmitting and receiving system comprising a similar arrangement of circuits and is connected to the already described duplex system in a manner, whereby the operation of one transmitter will not influence an operation of the other duplex signaling system, and where each of said two transmitters may be operated at the same or at different wave lengths.

The transmitting circuit may comprise similar apparatus as employed in connection with transmitting circuit 8 and receiving circuit 9, if desired, however the same will be described in connection with much less and different apparatus.

The transmitting apparatus consists of an alternator 62 having one terminal connected intermediate of coil $7^b$ of transformer 7 and a coil $3^b$ of transformer 3 to the terminals of a receiving circuit in a manner whereby transmitting current from alternator 62 and generator circuit 8 will similarly energize the transformers 7 and 3 but whereby the coils $3^a$ and $7^a$ will produce a current of zero potential at the terminals 9' and 9" of the receiving circuit 9 and also at the terminals 66 and 67 of the other receiving circuit if the same are energized by coils $7^b$ and $3^b$ from alternator 62, or vice versa. The other terminal of the alternator 62 is connected through a transmitting instrument 63 intermediate two condensers 64 and 65. Each of said condensers has the other terminal connected to terminals 66 and 67 of a receiving circuit 99 to which are connected the coils $7^b$ and $3^b$. It will be noted that current from one terminal of the alternator will flow to both terminals 66 and 67 of the receiving circuit in the same direction and strength either through the condensers 64 and 65 or through the inductances $7^b$ and $3^b$ of equal values and thus prevent producing a difference of alternator potential between the terminals 66 and 67. The condensers 64 and 65 should have the same capacity and coils $7^b$ and $3^b$ will be adjusted to have similar impedance with respect to one another and similar coupling with respect to coils $3^a$ and $7^a$ of the transmitting circuit 8. A secondary coil $7^c$ of transformer 7 will be connected to the mentioned separate aerial 2' which will be used for transmission and reception of signals at different wave lengths with respect to aerial 2.

The receiving circuit 99 from terminals 66 and 67 comprises a receiving coil 69. The latter has a variable inductance and may be tuned by condensers 64 and 65 if desired. In a coupled connection with coil 69 is a secondary coil 70 shunted by a condenser 71. One terminal of the latter is connected between two similarly wound coils 72 and 73 of a transformer 74 while the other terminal is connected intermediate two coils or resistances 75 and 76. The coils 72 and 75 are connected together and to one terminal of a battery 78 and a condenser 79. The coils 73 and 76 are also connected together and to the other terminals of battery 78 and condenser 79. This arrangement of circuits and elements serves for amplifying received currents by causing the same to surge in series with the battery 78 in both alternations of the received alternating current while the flow of the latter will be prevented in another direction by the higher voltage of the battery current. Thus received current will flow at one alternation from coil 70 through coil 73, battery 78 and coil 75 to coil 70 and at the alternate cycle through coil 76, battery 78 and coil 72. The amplified alternating current from coils 72 and 73 will be received by coupled coils 80 and 81 connected together at one terminal of a battery 82. Each other end of said coils 80, 81 is connected to one of two similar coils 83 and 84 and by a common terminal 85 through a magnetically opposite coil 86 to the second terminal of battery 82. A condenser 87 is arranged in shunt to coil 86 and tuned so that currents of the received frequency will surge through the condenser 87 while coil 86 has a high impedance for such currents. A tone wheel 88 interposed in the battery circuit will not excite the transformer 89 while operating when no signals are received for the fact that battery current direct of tone wheel modulated will flow through coils 83 and 84 in one direction and thence through coil 86 in an opposed direction and thus prevent the excitation of the receiving transformer 89. Coil 86 hereby will be made of sufficient impedance to offset coils 83 and 84. The operation is such that while a received alternating current may oppose the battery current through the coils 80 and 83 for instance, it will flow in series with the battery current through condenser 87 and coils 84 and 81 or vice versa.

A secondary coil 90 is loosely coupled to coils 83, 84 of transformer 89 and connected with one terminal to two opposing resistances or inductances 91 and 92 and by the latter to two coils 93 and 94 then connected together and to the other terminal of coil 90. A battery 95 is connected with one terminal between coils 94 and 92. The other terminal of said battery 95 is connected to a condenser 96 and a coil 97 in multiple with one another and then by an interrupting contact 98 to coils 93 and 91 in a manner whereby coil 97 produces an opposite magnetic field of a value as that of and with respect to coils 93, 94 so that a current from battery 95 does not produce a resultant magnetic field upon the coil 100. But if a received current surges through coil 90, it will flow through coil 92, battery 95, condenser 96 and coil 93 back to coil 90 in one direction and in the alternate direction through coil 94, battery 95, condenser 96 and coil 91. Thus coil 100 will be energized by received currents flowing in series with the battery current and thus will energize a receiving instrument 101 connected with coil 100.

It will be noted that the cooperation of the several parts will produce an efficient signaling device which will be advantageous to any other signaling device for signaling.

Having now fully described my invention, I claim as new and desire to secure by Letters Patent:—

1. In a signaling system the combination with electrical circuits, of transmitting apparatus and receiving apparatus and common radio circuits, a transmitting circuit connected with its one terminal to the common terminals of two separate coils and through the latter to the terminals of a receiving circuit and also to the separate terminals of two condensers, the latter being connected together and this common terminal being connected to the other terminal of said transmitting circuit, and means for connecting one of said separate coils with one of said common radio circuits.

2. In a signaling system the combination with electrical circuits, said circuits including common operating circuits for simultaneous distant communication and a plurality of transmitting and receiving apparatus, including two transformers, a transmitting circuit connected between coils of said two transformers with one terminal and between two similar impedance elements with the other terminal, a receiving circuit connecting with each terminal respectively one of said coils and one of said impedance elements, and a second transmitting and a receiving circuit connected similarly as said first mentioned circuits but to separate impedance elements and separate coils of said two transformers in a manner, whereby the operation of each one of said transmitting circuits and apparatus will not produce a difference of potential between the terminals of either of said receiving circuits and apparatus.

3. In a signaling system the combination with electrical circuits, said circuits including common operating circuits and amplifying circuits and conductors for distant communication, said amplifying circuits comprising two transformers, a source of current connected with one terminal between two opposed coils of one of said transformers and with the other terminal between two opposing coils of the other transformer, a condenser included in the circuits between said coils, the terminals of said coils of said two transformers being connected in series with one another, means for impressing a fluctuating current for receiving upon one of said transformers, and means for utilizing for transmitting a modified current from the other transformer, all for the purpose set forth.

4. In a signaling system the combination with electric circuits, of transmitting apparatus including a generator of high frequency currents and means for modifying and utilizing the same, said modifying means being included in one of said circuits between said generating and said utilizing means including circuits and including a coil traversed by high frequency currents, an iron core for said high frequency current coil arranged within said high frequency coil, said iron core having magnetizing coils arranged thereon in a manner whereby no current will result at the terminals of said magnetizing coils by induced currents traversing said high frequency coil, and means for modifying the mangnetization of said iron core connected with said magnetizing coils.

In testimony whereof, I have signed my name to this specification this 17th day of February, 1921.

AUGUST J. KLONECK.